May 5, 1936.  A. T. POTTER  2,039,836

WINDSHIELD FRAME

Filed April 6, 1934

INVENTOR.
Albert T. Potter
BY
Harness, Dickey, Pierce & Hann.
ATTORNEYS.

UNITED STATES PATENT OFFICE 2,039,836

WINDSHIELD FRAME

Albert T. Potter, Detroit, Mich., assignor to Ainsworth Manufacturing Company, a corporation of Michigan Application April 6, 1934, Serial No. 719,265
Original application May 19, 1932, Serial No. 612,267. Divided and this application April 6, 1934, Serial No. 719,265

The invention relates particularly to windshield frames or the like, and more specifically relates to an ornamental bar or strip for the frame and a method of fastening the strip to the frame. The invention also constitutes a division of my co-pending application for patent Serial No. 612,267, filed May 19th, 1932.

One object of the invention is to provide an ornamental bar or strip for windshield frames of the like, which may be manufactured inexpensively and readily attached to the frame for ornamental purposes.

Another object of the invention is to provide an ornamental bar or strip of the above mentioned character which is so fastened to the frame that it will not loosen or vibrate as a result of any movement or vibration of the vehicle upon which the frame is utilized.

Another object of the invention is to provide a method of fastening an ornamental bar or strip to a windshield frame or the like by means of which the strip is so held that it will not vibrate or become loosened during any movement or vibration of the vehicle upon which the frame is mounted.

For a better understanding of the invention, reference may be had to the accompanying drawing, forming a part of the specification, wherein.

Figure 1:
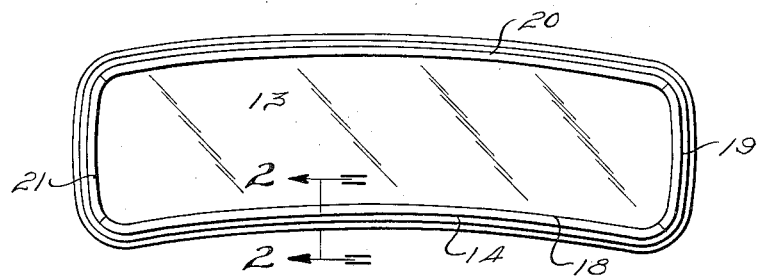
Figure 1 is a front elevational view of a windshield frame having an ornamental bar or strip, which may be constructed according to one form of the invention.
Figures 2, 3:
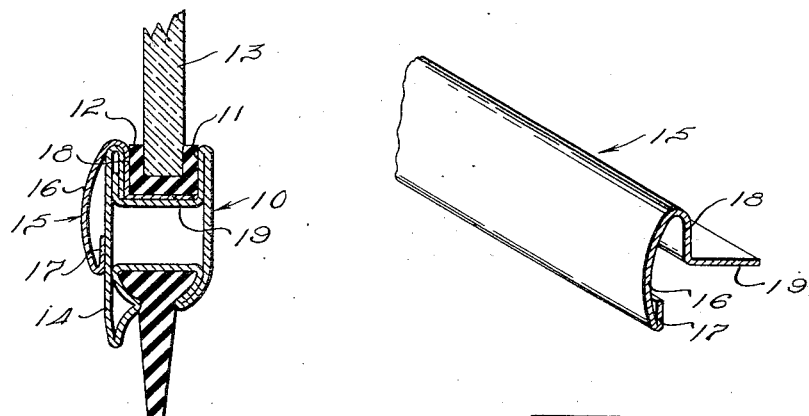
Fig. 2 is a cross sectional view on a larger scale, taken substantially along the line 2—2 of Fig. 1 and illustrating the manner in which an ornamental strip is assembled with the windshield frame and glass therein according to the form of the invention illustrated in Fig. 1.
Fig. 3 is a fragmentary, perspective view illustrating the ornamental strip shown by Fig. 2, as seen when removed from the windshield frame.

Referring to Figs. 1 and 2, a windshield frame is indicated at 10, and has a channel 11, within which a channel shaped rubber strip 12 may be employed for receiving edge portions of the windshield indicated at 13. As illustrated in Fig. 2, the front side or that side of the frame and windshield at the radiator side of the vehicle upon which the frame may be mounted is indicated at 14, and the present invention is concerned with an ornamental strip or bar which may extend around the front side of the windshield for enhancing the appearance of the vehicle. Preferably this ornamental strip will be chrome plated at least on its exposed surface.

Referring now to Figs. 2 and 3, the ornamental strip mentioned above is indicated at 15 and comprises a laterally bowed body portion 16, a reversely bent lower edge portion 17, a reversely bent upper edge portion 18 and a plane portion 19 projecting from the edge of the last mentioned bent portion. As shown in Fig. 2, the plane portion 19 and a major part of the bent portion 18, are complementary to the base of the channel 11, and the front side thereof, and hence fit snugly in the channel and receive the base and the one side wall of the rubber channel member 12. It is therefore apparent that the strip 15 will be firmly held in position by the glass 13. It will also be noted that the reversely bent portion 18 hooks over the outer leg of the channel of the frame, and that the reversely directed edge portion 17 of the strip contacts with the front wall of the frame. Normally this construction is such that the edge portion 17 is resiliently pressed against the front side of the frame, or in other words the bowed body portion 16 of the strip normally is urged towards the frame. While the entire strip 15 may be chrome plated, preferably only the exposed surface thereof will be so plated, and consequently, the strip provides a chrome plated ornamentation extending around the windshield frame. In practice it probably will be more practical to make the ornamental strip in four sections as indicated at 18, 19, 20 and 21.

It should be appreciated that it will be easier to manufacture an ornamental strip of this character separately of the windshield frame, chrome plate it, and then attach it to the windshield frame, than it would be to chrome plate the front wall of the windshield frame. It is apparent that the ornamental strip is held positively in place against any movement or vibration relative to the windshield frame and furthermore, it will be appreciated that the strip is held in place under tension and this is very advantageous for the purpose of continually preventing any loosening thereof with respect to the windshield frame. It is also apparent that the ornamental strip may be readily attached or associated with the windshield frame and that any sharp edge of the ornamental strip is concealed and that the strip has the appearance of having both edges rounded.

While only one form of the invention has been illustrated and described in detail, it will be apparent to those skilled in the art that various modifications may be made without departing from the scope of the appended claims.

I claim:

1. In combination, a windshield frame or the like having a channel, defined by a base and side walls, and a separate ornamental strip having a portion disposed along the base of the channel, a portion extending out of the channel along an inner side thereof, and a reversely turned portion extending along the outer side of the channel and frame and contacting with said outer side of the frame substantially at its free edge.

2. In combination, a windshield frame or the like having a channel, a glass in the channel, and a separate ornamental strip having a portion disposed in the channel and a portion projecting out of the channel, said glass serving to hold the strip in the channel, and said portion projecting out of the channel being reversely turned and contacting substantially at its free edge with the outer surface of that side of the frame adjacent the projecting portion.

3. In combination, a windshield frame or the like having a channel, a glass in the channel, and a separate ornamental strip having a portion disposed in the channel and a portion projecting out of the channel, said glass serving to hold the strip in the channel, and said portion projecting out of the channel being reversely turned and terminating in a reversely turned edge directed towards the outer face of that side of the frame adjacent said projecting portion and substantially contacting therewith, thereby concealing the free edge of the strip.

ALBERT T. POTTER.